US006560006B2

(12) United States Patent
Sigalas et al.

(10) Patent No.: US 6,560,006 B2
(45) Date of Patent: May 6, 2003

(54) TWO-DIMENSIONAL PHOTONIC CRYSTAL SLAB WAVEGUIDE

(75) Inventors: Mihail M. Sigalas, Santa Clara, CA (US); Annette Grot, Cupertino, CA (US); Laura W. Mirkarimi, Sunol, CA (US); Curt Flory, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/846,748

(22) Filed: Apr. 30, 2001

(65) Prior Publication Data

US 2002/0159126 A1 Oct. 31, 2002

(51) Int. Cl.[7] .............................. G02F 1/00; G02B 6/12
(52) U.S. Cl. ....................................... 359/321; 385/130
(58) Field of Search ................................. 359/321, 515, 359/296; 333/126, 134; 385/130, 129, 125; 65/393, 401, 404

(56) References Cited

U.S. PATENT DOCUMENTS

| | | | | |
|---|---|---|---|---|
| 5,335,240 A | * | 8/1994 | Ho et al. ....................... 372/39 |
| 5,600,483 A | * | 2/1997 | Fan et al. ..................... 359/245 |
| 5,748,057 A | * | 5/1998 | De Los Santos ............ 333/134 |
| 6,134,043 A | | 10/2000 | Johnson et al. ............. 359/237 |
| 6,134,369 A | | 10/2000 | Kurosawa ..................... 385/132 |
| 6,175,671 B1 | * | 1/2001 | Roberts ........................ 385/14 |
| 6,260,388 B1 | * | 7/2001 | Borrelli et al. ............... 65/393 |
| 6,366,392 B1 | * | 4/2002 | Tokushima .................. 359/321 |
| 2002/0009277 A1 | * | 1/2002 | Noda et al. .................. 385/130 |

OTHER PUBLICATIONS

S.G. Johnson, S. Fan, P.R. Villeneuve, L.A. Kolodziejski and J.D. Joannopoulos, "Guided Modes in Photonic Crystal Slabs", Phys. Rev.; vol. 60, No. 8; Aug. 15, 1999; pp. 5751–5758.

A.A. Maradudin, A.R. McGurn, "Photonic Band Structure of a Truncated, Two–Dimensional Periodic Dielectric Structure", J. Opt Soc. Am.; vol. 10, No. 2; Feb. 1993; pp. 307–313.

Johnson, Steven G., "Linear Waveguides in Photonic–Crystal Slabs", Physical Review B, vol. 62, No. 12, Sep. 15, 2000, pp. 8212–8222.

Imada, Masahiro et al., "Light–Emitting Devices with One– and Two–Dimensional Alr/Semiconductor Gratings Embedded by Wafer Fusion Technique", Semiconductor Laser Conference, Oct. 4, 1998, pp. 211–212.

Maradudin, A.A., "Photonic Band Structure of a Truncated, Two–Dimensional, Periodic Dielectric Medium", Journal of the Optical Society of America, vol. 10, No. 2, Feb. 1, 1993, pp. 307–313.

Whittaker, D.M. et al., "Photonic Band Structure of Patterned Waveguides with Dielectric and Metallic Cladding", Physical Review B, vol. 65, 073102, pp. 1–4.

Poborchii, Vladimir, "Photonic Crystal Slab Mode of Si Pillars: Transmittance and Waveguide Properties", 4th Pacific Rim COnference on Lasers and ELectro–Optics, Jul. 15–19, 2001, pp. 21–22.

Hwang, J.K., "Continuous Room–Temperature Operation of Optically Pumped Two–Dimensional Photonic Crystal Lasers at 1.6 um", IEEE Photonics Technology Letters, vol. 12, No. 10, Oct. 2000, pp. 1295–1297.

* cited by examiner

*Primary Examiner*—Georgia Epps
*Assistant Examiner*—Omar Hindi (57) ABSTRACT

Two-dimensional photonic crystal slab apparatus and a method for fabricating two-dimensional photonic crystal slab apparatus. A two-dimensional photonic crystal slab apparatus has a photonic crystal slab containing a two-dimensional periodic lattice, and upper and lower cladding layers for the photonic crystal slab, the upper and lower cladding layers each having a metallic cladding layer. The metallic cladding layers permit achieving substantially perfect light transmission through a waveguide in the slab, even when the waveguide is strongly bent. The fabrication method includes forming a two-dimensional photonic crystal slab from a dielectric slab supported on a substrate by, for example, an etch process.

20 Claims, 11 Drawing Sheets

TWO-DIMENSIONAL PHOTONIC CRYSTAL SLAB WAVEGUIDE

BACKGROUND OF THE INVENTION

1. Field of the Invention

The present invention relates generally to the field of photonic crystals; and, more particularly, to two-dimensional photonic crystal slab apparatus and to a method for fabricating a two-dimensional photonic crystal slab apparatus.

2. Description of the Prior Art

Photonic crystals (PC) are periodic dielectric structures which can prohibit the propagation of light in certain frequency ranges. More particularly, photonic crystals have spatially periodic variations in refractive index; and with a sufficiently high refractive index contrast, photonic bandgaps can be opened in the structure's optical spectrum. (The term "photonic bandgap" as used herein and as used in the art is a frequency range within which propagation of light through the photonic crystal is prevented. In addition, the term "light" as used herein is intended to include radiation throughout the electromagnetic spectrum, and is not limited to visible light.)

A photonic crystal that has spatial periodicity in three dimensions can prevent the propagation of light having a frequency within the crystal's bandgap in all directions; however, fabrication of such a structure is technically challenging. A more attractive alternative is to utilize a two-dimensional photonic crystal slab that has a two-dimensional periodic lattice incorporated within it. In a structure of this sort, light propagating in the slab is confined in the direction perpendicular to a major surface of the slab via total internal reflection; whereas propagation in other directions is controlled by the properties of the photonic crystal slab. In addition to being easier to fabricate, two-dimensional photonic crystal slabs provide the further advantage that they are compatible with the planar technologies of standard semiconductor processing.

It is known that introducing defects in the periodic structure of a photonic crystal allows the existence of localized electromagnetic states that are trapped at the defect site, and that have resonant frequencies within the bandgap of the surrounding photonic crystal material. By providing a line of such defects extending through the photonic crystal, a waveguiding structure is created that can be used in the control and guiding of light (see J. D. Joannopoulos, R. D. Meade, and J. N. Winn, "Photonic Crystals", Princeton University Press, Princeton, N.J., 1995).

A two-dimensional photonic crystal slab waveguide often comprises a two-dimensional periodic lattice in the form of an array of posts incorporated in a slab body. The posts can, for example, comprise holes in a slab body of dielectric material (see U.S. Pat. No. 6,134,369), or the posts can comprise dielectric rods and the slab body can be air, another gas or a vacuum. In addition, the posts can comprise rods of a dielectric material having a first refractive index and the slab body can comprise a dielectric material having a second refractive index different from the first refractive index. In any of these devices, the guided modes within the two-dimensional photonic crystal slab may suffer high losses due to the overlap of these modes with leaky modes. These leaky modes will eventually escape into the upper and/or lower cladding for the photonic crystal. High guiding efficiency can be achieved only in a narrow frequency region, close to the upper or lower edge (for dielectric rods or holes, respectively) of the waveguide band, where there are no leaky modes (see S. G. Johnson, S. Fan, P. R. Villeneuve, L. Kolodziejski and J. D. Joannopoulos, Phys. Rev. B 60, 5751, 1999 and S. G. Johnson, P. R. Villeneuve, S. Fan and J. D. Joannopoulos, Phys. Rev. B 62, 8212, 2000).

For both holes and the dielectric rod designs, there are also problems with the mixing between TE-like and TM-like waves. Since only one type of waves exhibits a full band gap, this mixing of the two types of waves can be expected to increase the losses. The mixing of the two modes can happen either by changing the polarization of the incident light or by breaking the mirror symmetry of the structure relative to the plane in the middle of the two-dimensional photonic crystal slab. Defects in the structure or an asymmetric cladding for the device (e.g., an air cladding on top and a low dielectric material cladding below) can easily break that symmetry. Using a Bragg mirror (or a one-dimensional photonic crystal) for cladding material is not going to help much because the photonic crystal will not have a complete photonic bandgap and there will still be a problem with leaky modes (see U.S. Pat. No. 6,134,043).

Also, for the design in which dielectric rods are provided within an air slab body, the height of the rods should be about two times the lattice constant. This makes the fabrication of these structures rather difficult.

SUMMARY OF THE INVENTION

Embodiments of the present invention provide two-dimensional photonic crystal slab apparatus and a method for fabricating a two-dimensional photonic crystal slab apparatus. A two-dimensional photonic crystal slab apparatus according to the invention may comprise a photonic crystal slab that includes a two-dimensional periodic lattice, and upper and lower cladding layers for the photonic crystal slab, the upper and lower cladding layers each including a metallic cladding layer.

According to a first embodiment of the invention, the two-dimensional photonic crystal slab apparatus comprises a two-dimensional photonic crystal slab waveguide apparatus in which the photonic crystal slab includes a waveguide that is capable of transmitting light having a frequency within a bandgap of the photonic crystal slab. Preferably, the waveguide is created by providing a region of defects in the two-dimensional periodic lattice of the slab. Specifically, the two-dimensional periodic lattice may comprise a two-dimensional array of dielectric structures, such as dielectric rods; and the region of defects may be provided by reducing the radii of a line of the rods or by omitting a line of the rods.

A two-dimensional photonic crystal slab waveguide apparatus according to an embodiment of the present invention achieves substantially perfect transmission of light through the waveguide, even along waveguides that are tightly bent. This is achieved, at least in part, because the upper and lower metallic cladding layers cause the light to be confined between the two metallic layers, such that there are no losses due to the coupling to leaky modes of the cladding layers.

In addition, it can be shown that TE-like modes can be moved to frequencies above the lowest bandgap of TM-like modes by changing the separation between the metallic layers. Thus, for a separation of 0.5a (a is the lattice constant), one can have a complete bandgap for the TM-like modes (see A. A. Maradudin and A. R. McGurn, J. Opt. Soc. Am., 10, 307, 1993). This facilitates fabrication of the waveguide apparatus since the rods forming the two-dimensional array can be made shorter.

According to another embodiment of the present invention, a method for fabricating a two-dimensional photonic crystal slab apparatus is provided. A method for fabricating a two-dimensional photonic crystal slab apparatus according to the invention may include providing a dielectric slab supported on a substrate, forming a two-dimensional array of dielectric structures in the dielectric slab to form a two-dimensional photonic crystal slab, and forming first and second cladding layers on first and second surfaces of the photonic crystal slab, the first and second cladding layers each including a metallic cladding layer.

According to an embodiment of the invention, forming a two-dimensional array of dielectric structures in the dielectric slab comprises forming a two-dimensional array of structures using an etch process. As is well-known, it is usually difficult to grow optical quality semiconductors on metals. The fabrication method according to the present invention does not require the growing of crystals; and, accordingly, is particularly suitable for use in fabricating two-dimensional photonic crystal slab apparatus having metallic cladding layers. Forming first and second cladding layers on first and second surfaces of the photonic crystal slab can be accomplished in various ways, depending on various kinds of materials used in fabricating the apparatus.

As is also known in the art, it is desirable that the two-dimensional photonic crystal slab be fabricated from single crystalline materials; and the fabrication method of the present invention permits various kinds of material systems to be utilized; including, for example, systems based on Si, InGaAsP and GaAs. In general, the fabrication method according to embodiments of the present invention can be utilized with any of these systems with only minor modification of the method being required.

Yet further advantages and specific details of the present invention will become apparent hereinafter in conjunction with the following detailed description of the invention.

BRIEF DESCRIPTION OF THE DRAWINGS

FIG. 7 illustrates the distribution of the fields for the bent waveguide configuration of FIG. 4 at a frequency of 0.324 c/a;

DETAILED DESCRIPTION OF THE INVENTION

Figure 1:
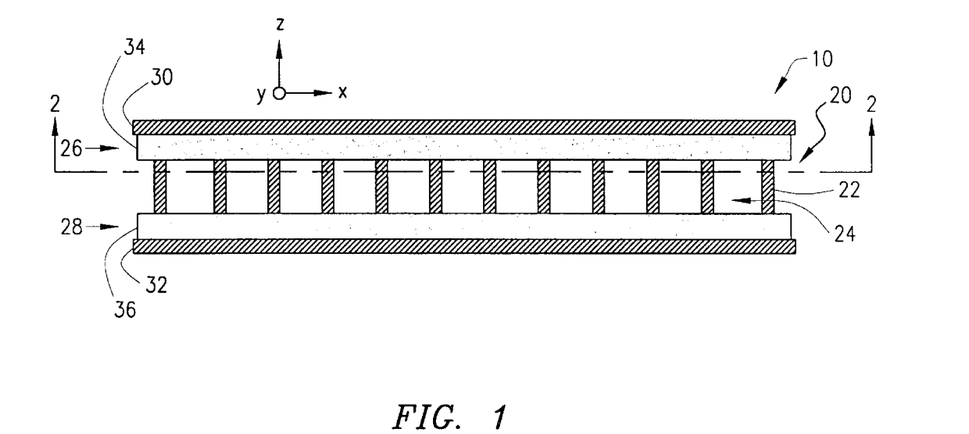
FIG. 1 is a schematic, xz view of a two-dimensional photonic crystal slab apparatus according to a first embodiment of the present invention.

FIG. 1 is a schematic, xz view of a two-dimensional photonic crystal slab apparatus according to a first embodiment of the invention. The apparatus is generally designated by reference number 10, and comprises a photonic crystal slab 20 comprised of a two-dimensional periodic lattice incorporated within a slab body. In the illustrated embodiment, the periodic lattice is composed of a two-dimensional array of posts 22 that comprise rods of a material having a high dielectric constant, for example, Si or GaAs, and the slab body, designated by reference number 24, comprises air. It should be understood, however, that photonic crystal slab 20 is intended to be exemplary only. In other embodiments of the invention, for example, the slab body can be a different gas or a vacuum. Alternatively, the posts 22 can comprise holes and the slab body 24 can comprise a dielectric material; or the posts and the slab body can both comprise dielectric materials that differ in dielectric constant.

Figure 2:
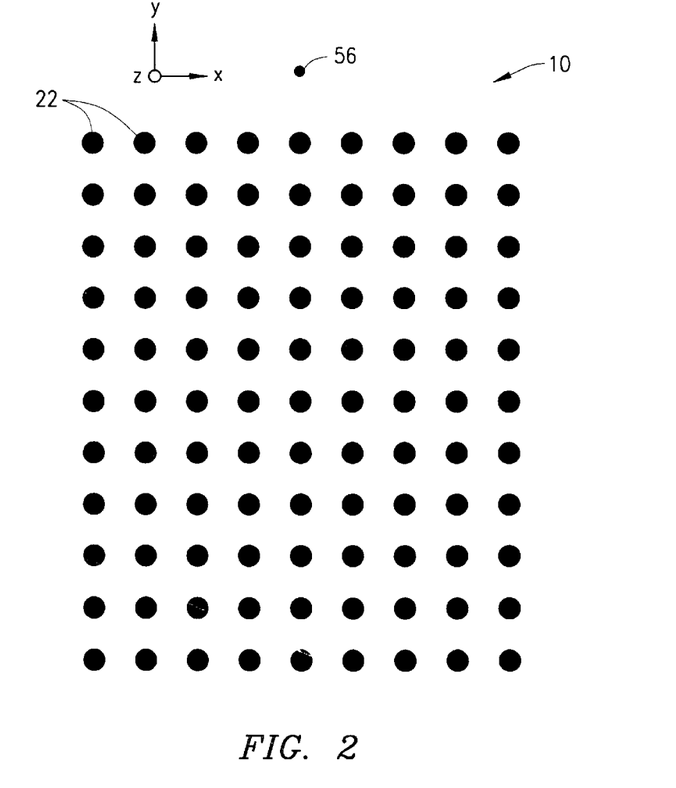
FIG. 2 is a schematic, xy cross-sectional view illustrating the periodic structure of the photonic crystal slab apparatus of FIG. 1.

As illustrated in FIG. 2, which is an xy cross-sectional view of the photonic crystal slab apparatus 10 of FIG. 1, the two-dimensional array of rods 22 comprises a rectangular array of rods. A rectangular array is also intended to be exemplary only, as other configurations, for example, a square-shaped array or a triangular-shaped array, can be utilized as well without departing from the scope of the present invention.

Referring back to FIG. 1, the photonic crystal slab apparatus 10 also includes upper and lower cladding layers 26 and 28 positioned above and below the photonic crystal slab 20 and covering the entire upper and lower faces, respectively, of the photonic crystal slab (In the embodiment of FIG. 1 in which the slab body is air, the upper and lower faces of the slab are, in effect, defined by the upper and lower surfaces of the dielectric rods 22.).

The upper and lower cladding layers 26 and 28, respectively, comprise upper and lower metallic cladding layers 30 and 32; and, optionally, upper and lower dielectric cladding layers 34 and 36, preferably oxide cladding layers, applied between the metallic cladding layers 30 and 32 and the faces of the slab body 20. The oxide cladding layers 34 and 36 have a low dielectric constant (e.g., $SiO_2$) and can be used to minimize any possible absorption due to the metal. It is also possible, if desired, to replace the air in the photonic crystal slab by an oxide.

Figure 3:
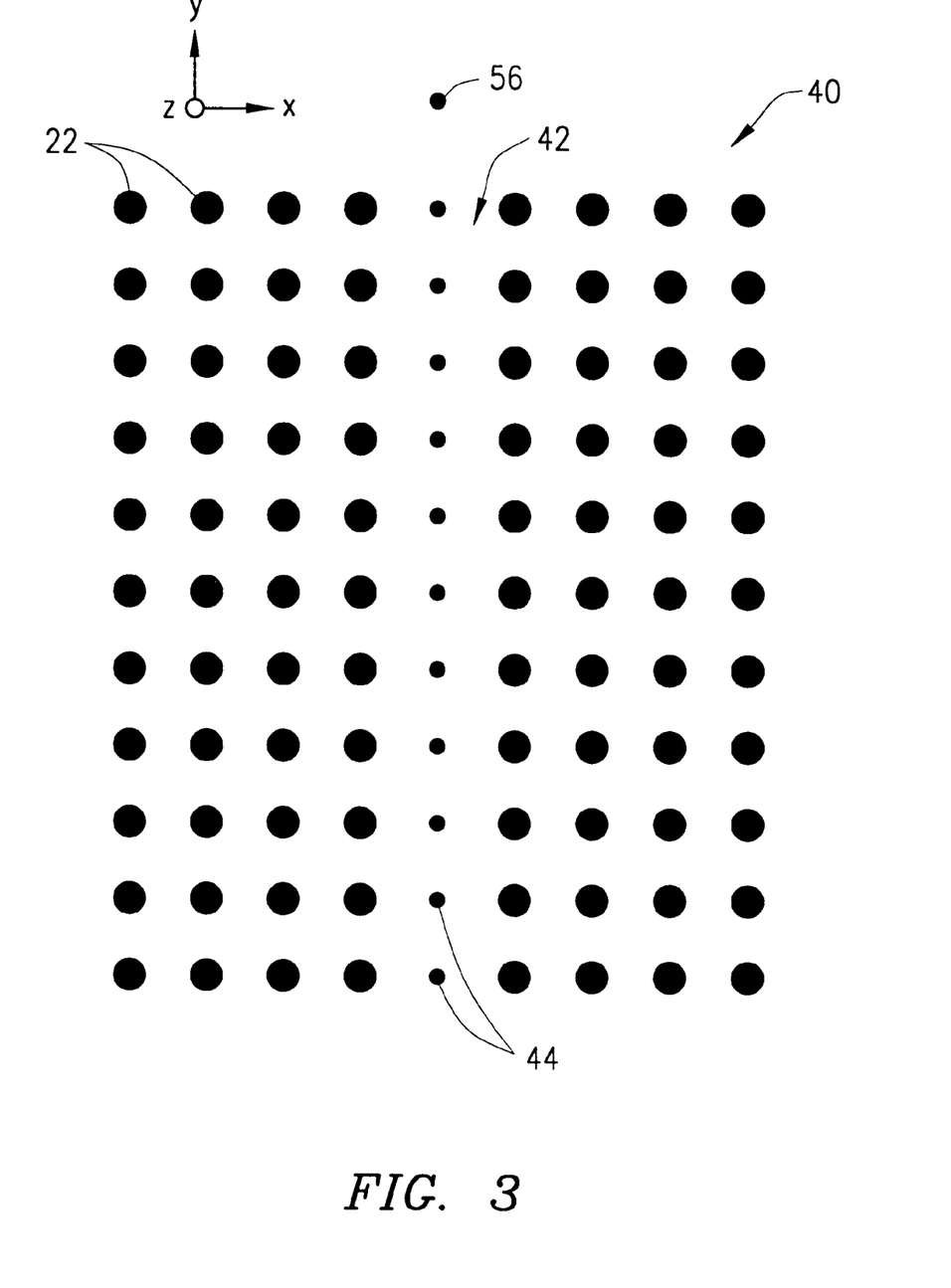
FIG. 3 is a schematic, xy cross-sectional view illustrating a photonic crystal slab waveguide apparatus having a straight waveguide according to one embodiment of the present invention.

FIG. 3 is an xy cross-sectional view of a two-dimensional photonic crystal slab waveguide apparatus according to an embodiment of the invention. The waveguide apparatus, generally designated by reference number 40, is similar to apparatus 10 of FIGS. 1 and 2, except that a region of defects is provided in the array of rods 22. This region of defects is generally designated by reference number 42, and defines a waveguide through the photonic crystal slab. The waveguide is capable of transmitting light having a frequency within a bandgap of the surrounding photonic crystal material. The region of defects 42 can be provided in various ways. For example, in FIG. 3, the region is created by providing a line of rods 44 of reduced radius. Alternatively, the region of defects can be created by omitting one or more lines of the rods 22, or by altering one or more lines of the rods 22 in some other manner.

Figure 4:
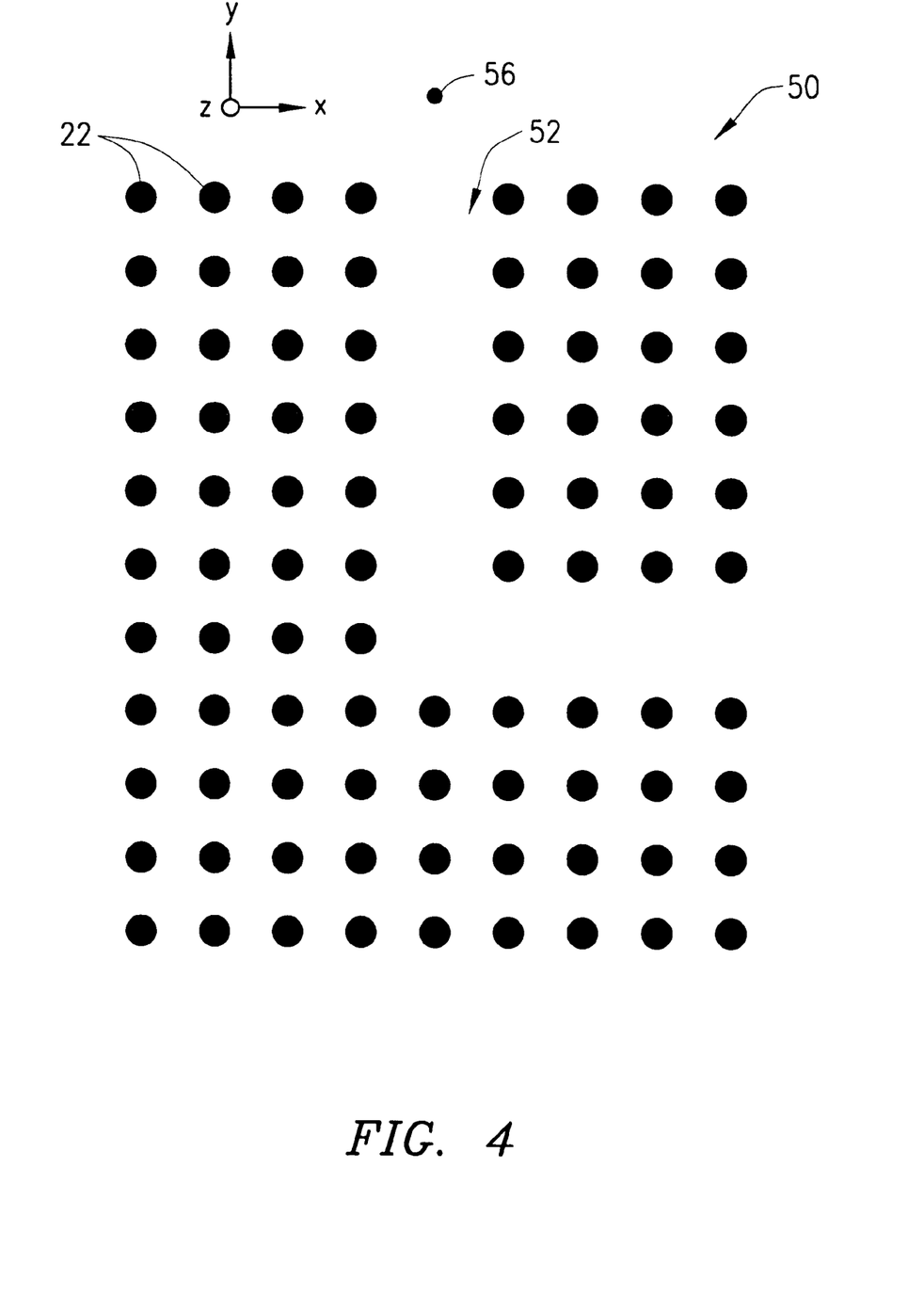
FIG. 4 is a schematic, xy cross-sectional view illustrating a photonic crystal slab waveguide apparatus having a bent waveguide according to a further embodiment of the present invention.

In FIG. 3 also, the region of defects 42 is shown as extending through the apparatus 40 from one end thereof to the opposite end in a straight line so as to define a straight waveguide. The region of defects may also be arranged in a bent configuration as shown in FIG. 4. Specifically, FIG. 4 is an xy cross-sectional view of a two-dimensional photonic crystal slab waveguide apparatus 50 incorporating a waveguide 52 that includes a 90 degree bend therein. In the embodiment of FIG. 4, the bent waveguide has been created by omitting rods 22 from portions of two rows of the array which are perpendicular to each other.

In order to establish the effectiveness of a two-dimensional photonic crystal slab waveguide apparatus according to the present invention, the fields were calculated using the Finite Difference Time Domain (FDTD) method (see A. Taflove, "Finite Difference Time Domain Method"). In the calculated system, the apparatus comprised a periodic lattice in the form of a 9×12 array of rods 22, along the x and y axis. The thickness of the photonic crystal slab 20 was 0.5a, where a is the lattice constant of the lattice. The radius of the rods was r=0.22a, except that the radius of the rods along the waveguide was 0 (i.e., the waveguide was formed by omitting a line of rods). The length of the rods was 0.5a. A dipole, polarized parallel to the z-axis, was placed outside of the structure as illustrated at 56 in FIGS. 2–4) and was excited by a pulse. The thickness of the metallic layers 30, 32 was 0.125a. There were no upper or lower oxide layers 34 and 36 in the apparatus.

Figure 5:
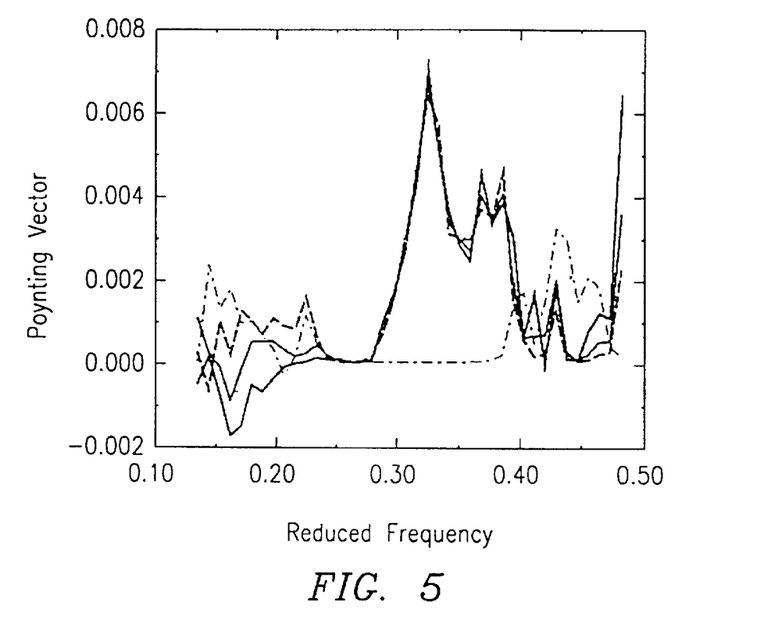
FIG. 5 illustrates the magnitude of the Poynting vectors for the two-dimensional photonic crystal slab apparatus of FIGS. 1 and 2 and for the two-dimensional photonic crystal slab waveguide apparatus of FIG. 3 (The frequency is in c/a units where c is the velocity of light and a is the lattice constant)

The Poynting vector was calculated inside the crystal in an xy plane half way between the layers 30 and 32. For the periodic case (i.e., for a photonic crystal slab apparatus as illustrated in FIGS. 1 and 2 without a waveguide), there is a bandgap of reduced frequency between 0.24 and 0.38 (shown by the dotted-dashed line in FIG. 5). The Poynting vector was zero inside this gap. When the straight waveguide 42 is provided in the photonic crystal slab as shown in FIG. 3, however, a waveguide band appears inside the gap. The Poynting vector profile was almost the same at three different locations inside the waveguide (illustrated by the solid, the dotted and the dashed lines in FIG. 5) indicating the very good transmission properties of the waveguide.

Figure 6:
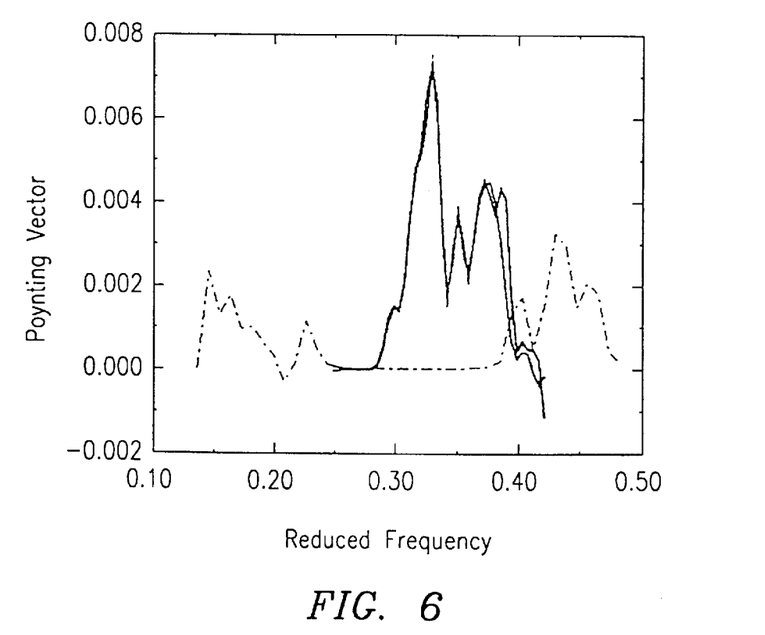
FIG. 6 illustrates the magnitude of the Poynting vectors for the two-dimensional photonic crystal slab apparatus of FIGS. 1 and 2 and for the two-dimensional photonic crystal slab waveguide apparatus of FIG. 4 (The frequency is in c/a units)
Figure 7:
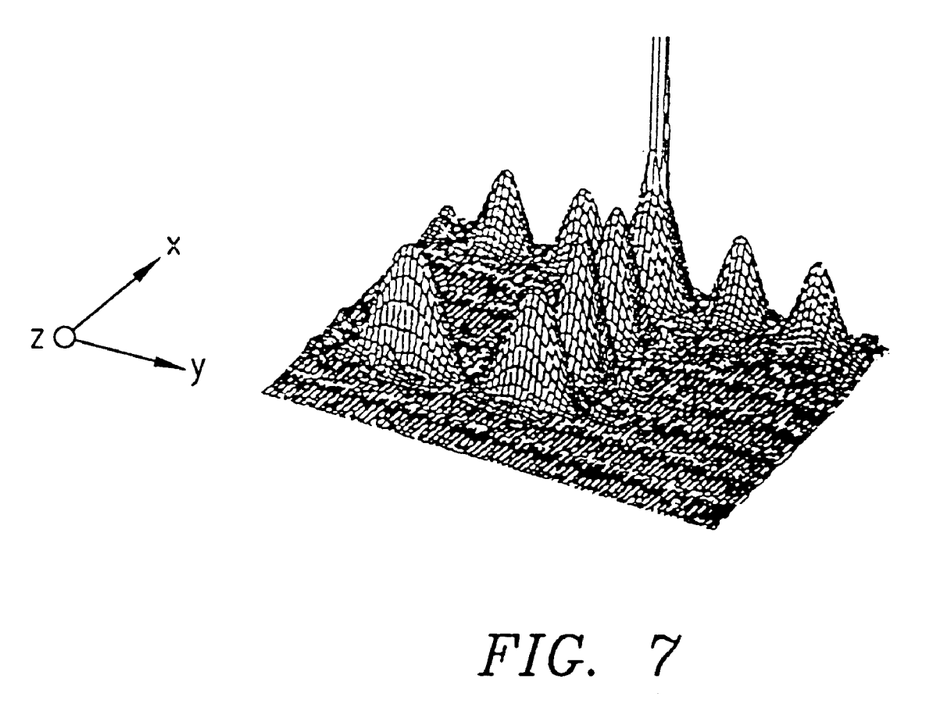

For the photonic crystal slab waveguide apparatus of FIG. 4, with a bent waveguide 52, the Poynting vectors at locations before and after the bend are shown by solid and dotted lines, respectively, in FIG. 6. The vectors are almost identical which evidences that the transmission properties of the bent waveguide are equally as good as those of the straight waveguide. FIG. 7 illustrates the distribution of power inside the bent waveguide configuration, and confirms that the light can be turned around a 90 degree bend without any losses; and thus is in agreement with the results shown in FIG. 6.

There are several constraints that must be considered in connection with the fabrication of two-dimensional photonic crystal slab apparatus such as those described above. Initially, since these apparatus involve propagation of light, it is desirable that single crystalline materials be used as the basis for the apparatus. The photonic crystal slab apparatus illustrated in FIG. 1 contains a layered structure of metal/oxide/dielectric/oxide/metal. In this apparatus, the refractive index of the cladding layers should range from 1–2.0, and the refractive index of the dielectric rods 22 (the core) should be between 3 and 4. Since it is extremely difficult to grow optical quality semiconductors on metal, alternative methods for fabricating two-dimensional photonic crystal slab apparatus are provided according to embodiments of the invention.

For the case where 1<n<2.0/3<n<4/1<n<2.0 for the cladding layer/photonic crystal core/cladding layer, there are several material systems that can satisfy the above requirements including $SiO_2/Si/SiO_2$, $Al_2O_3/InGaAsP/Al_2O_3$ and $Al_2O_3/GaAs/Al_2O_3$.

Figure 8A:
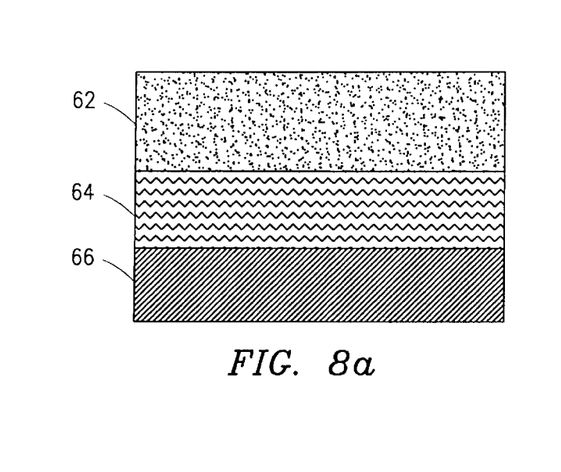
FIGS. 8a–8i schematically illustrate a method for fabricating a two-dimensional Si-based photonic crystal slab apparatus according to another embodiment of the invention.

FIGS. 8a–8i illustrate a process for fabricating a Si-based two-dimensional photonic crystal slab apparatus according to one embodiment of the present invention. Initially, FIG. 8a illustrates a structure that includes a single crystal Si core 62 bonded to an $SiO_2$ sacrificial layer 64 which, in turn, is supported on an Si substrate 66. Such $Si/SiO_2/Si$ insulator structures are commercially available.

Figure 8B:
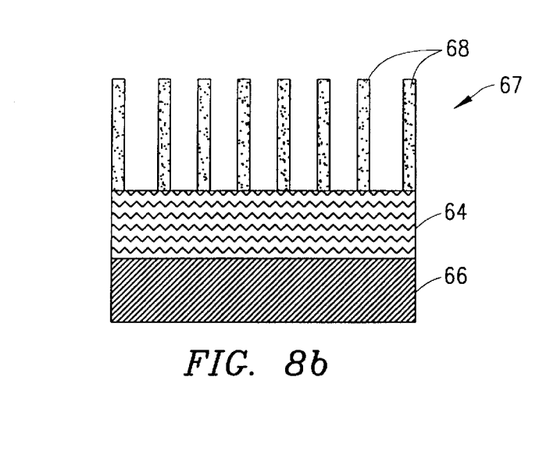

A photonic crystal structure is then fabricated from the Si core layer 62, preferably utilizing an appropriate etch process. Specifically, a photonic crystal lattice is patterned into a transfer resist using e-beam lithography or another nanolithography technique so as to obtain dielectric rods in the Si. One may transfer a pattern into a hard mask of metal or $SiO_2$ using reactive ion etching. Next, the pattern is transferred into the Si core 62 by etching the Si core 62 to form a photonic crystal slab 67 comprised of a two-dimensional array of Si rods 68 as shown in FIG. 8b. A controlled etch will enable the etch to be stopped at the $SiO_2$ sacrificial layer 64. Preferably, the two-dimensional array of Si rods 68 is fabricated to include a region of defects therein (not shown in FIG. 8b), either straight or bent to form a straight or bent waveguide in the photonic crystal slab 67.

Figure 8C:
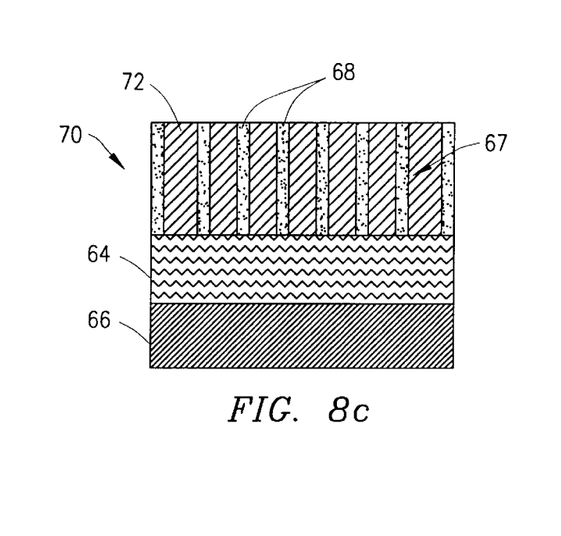

For ease in handling and to facilitate completing of the apparatus fabrication, the structure of FIG. 8b is then planarized with an organic or inorganic medium 72 as shown in FIG. 8c to form the photonic crystal slab 67 into a planarized stack layer 70. The planarizing medium 72 should have sufficient viscosity to enable the medium to fully fill the area around the dielectric rods 68. Some good choices for the planarizing medium include polyimide, spin-on glass or PECVD grown $SiO_2$.

Figure 8D:
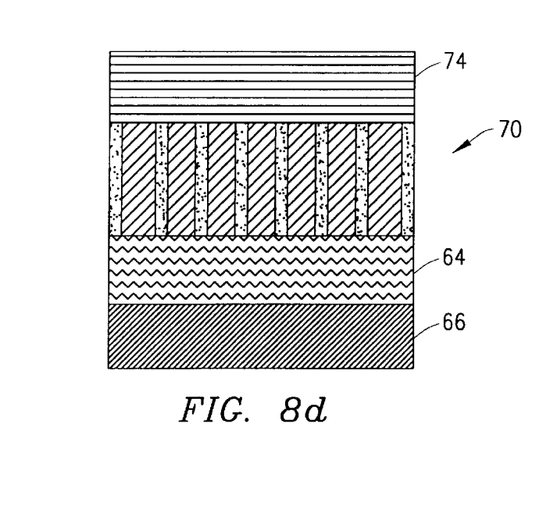
Figure 8E:
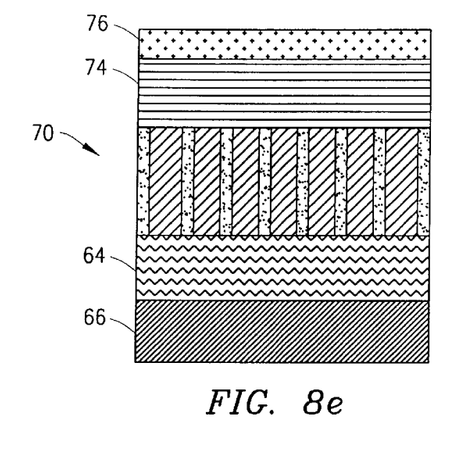
Figure 8F:
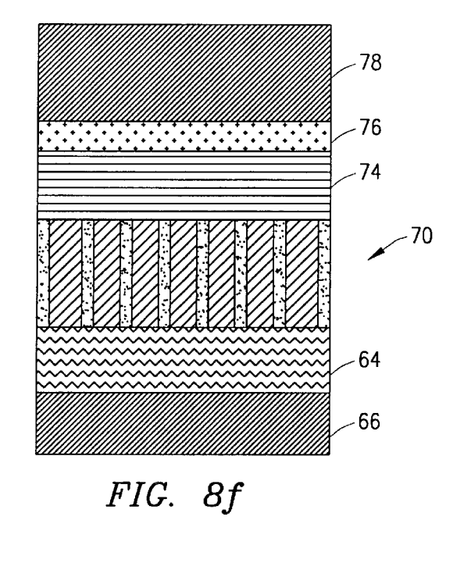

The next step of the procedure is to deposit a cladding layer 74 on top of the planarized stack layer 70 (FIG. 8d). This cladding layer is a thin layer of a low index medium, which may be either organic or inorganic (e.g., $SiO_2$). Next, a metal stack structure 76 is applied to the top surface of the cladding layer 74 by evaporation or sputter deposition (FIG. 8e). This metal structure is then used to join the structure in FIG. 8e to another substrate 78 as illustrated in FIG. 8f.

The metal stack layer 76 contains an adhesion layer and a bonding layer material. The bonding layer material can be a material that forms a low temperature Silicide such as Ni or Pt. Alternatively, a metal composite may be used to bond the substrate 78 through a reflow process or a thermo-compression process. The metal choices for reflow or thermo-compression are numerous and include In and Pb alloys or Au.

Figure 8G:
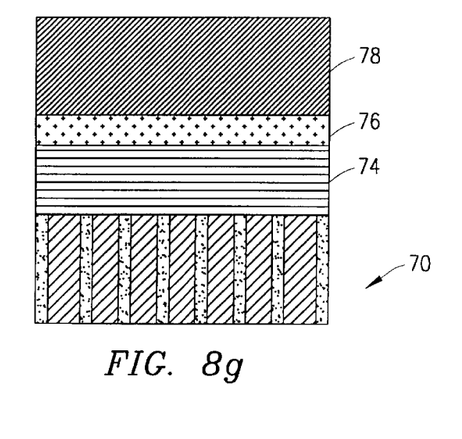
Figure 8H:
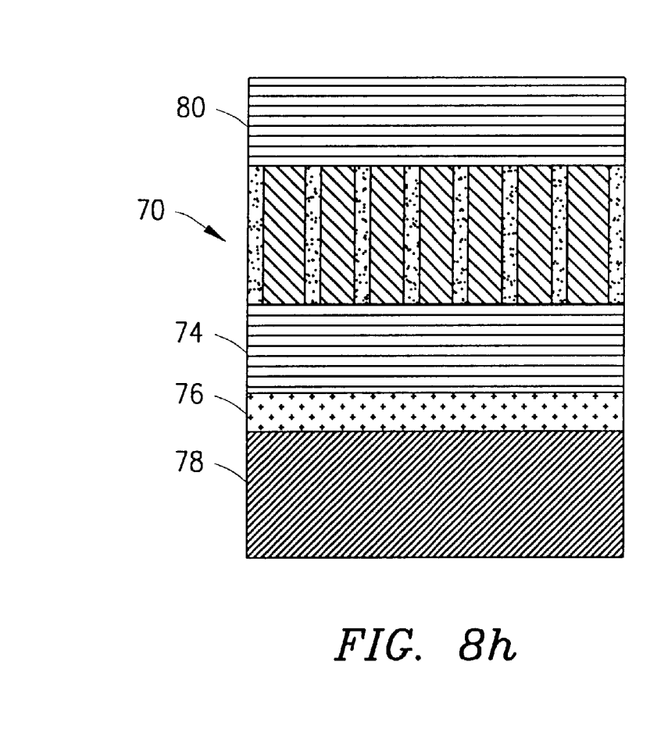

Next, the original substrate 66 is removed. This may be done by selectively etching away the sacrificial layer 64, which will also result in removal of the substrate (FIG. 8g). One procedure for accomplishing this is to select an organic material for the planarized stack layer 70, and to use an HF solution to etch away the sacrificial layer 64.

Figure 8I:
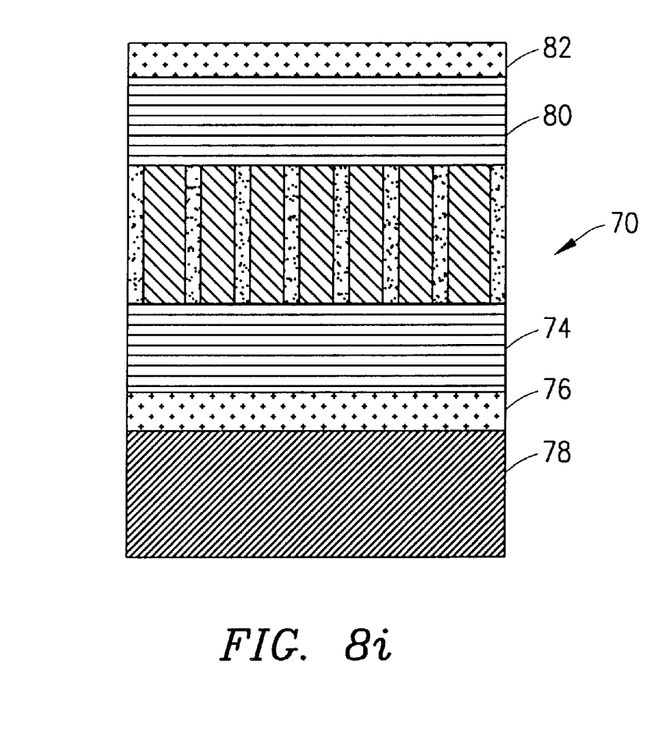

Following the removal of the substrate 66, an inorganic or organic cladding layer 80, is deposited on the planarized stack layer 70 (see FIG. 8h) by either PECVD or spin-on techniques. Note that the structure in FIG. 8g has been turned over prior to depositing the cladding layer 80 shown in FIG. 8h. Finally, a thin metallic film 82 is deposited on the cladding layer 80 to complete the structure (FIG. 8i). The structure in FIG. 8i comprises a completed two-dimensional photonic crystal slab apparatus that includes a photonic crystal slab comprised of the planarized stack layer 70, typically with a waveguide provided therein as described above, and upper and lower cladding layers, with the lower cladding layer being supported on a substrate 78. The upper cladding layer comprises a low index medium cladding layer 80 and a metallic cladding layer 82; and the lower cladding layer comprises a low index medium cladding layer 74 and a metallic cladding layer 76.

Figure 9:
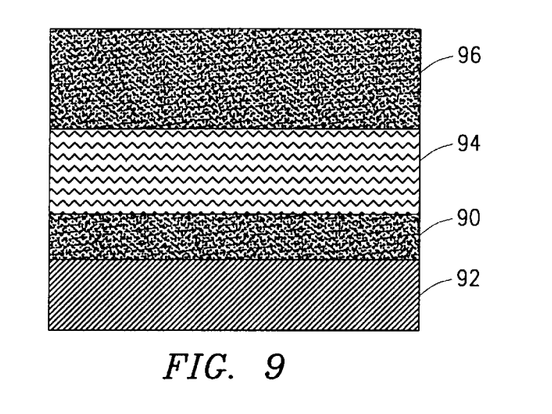
FIG. 9 schematically illustrates a method for fabricating an InP or a GaAs-based two-dimensional photonic crystal slab apparatus according to an alternative embodiment of the present invention.

For embodiments employing InP or GaAs-based materials for the photonic crystal slab apparatus, rather than Si-based materials: the fabrication process should be modified somewhat. In these embodiments, the preferred low refractive index material for the cladding layers is $Al_2O_3$, and in $Al_2O_3/InGaAsP/Al_2O_3$ and $Al_2O_3/GaAs/Al_2O_3$ material systems, there are a few important differences that should be mentioned. Initially, as shown in FIG. 9, a sacrificial layer 90 is deposited on the substrate 92 and a cladding layer 94 is then deposited on the sacrificial layer 90. This enables the later removal of the substrate 92 without harming the InP or GaAs rods that will be formed in the dielectric core layer 96. Typically, the heterostructures will be deposited with an AlAs/InAs or AlGaAs cladding layer 94 beneath the InP or GaAs core layer, respectively. This cladding layer is oxidized through a wet oxidation process that creates the $Al_2O_3$ cladding layer. Following the wet oxidation, the sample is processed generally as shown in FIG. 8. Specifically, a dielectric core layer 96 is deposited, a planarized stack layer is formed from the dielectric core layer 96, oxide and metallic cladding layers are provided on top of the planarized stack layer, and the substrate 92 is removed by removing the sacrificial layer 90. In the embodiment of FIG. 9, however, inasmuch as the oxide cladding layer 94 has previously been applied, it is only necessary to apply the second metallic cladding layer onto the oxide cladding layer 94.

Figure 10A:
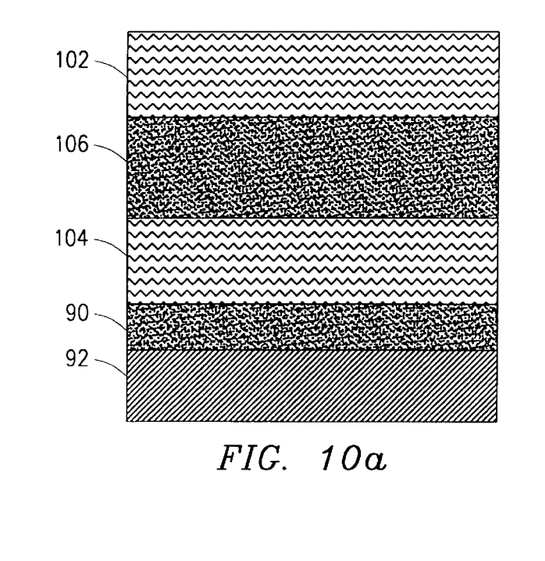
FIGS. 10a–10g schematically illustrate a method for fabricating an InP or a GaAs-based two-dimensional photonic crystal slab apparatus according to yet a further embodiment of the present invention.
Figure 10B:
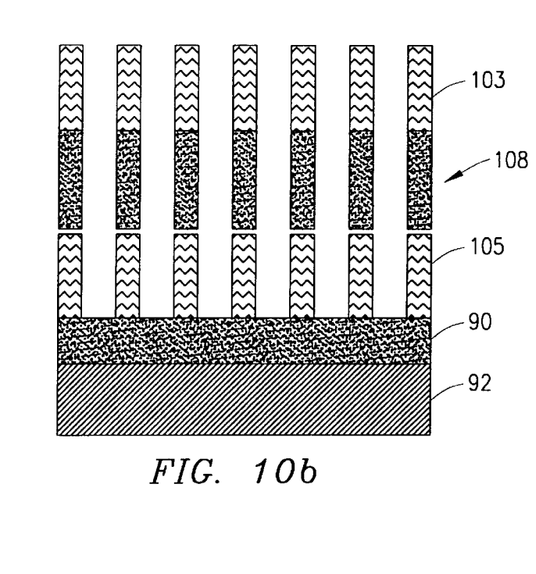
Figure 10C:
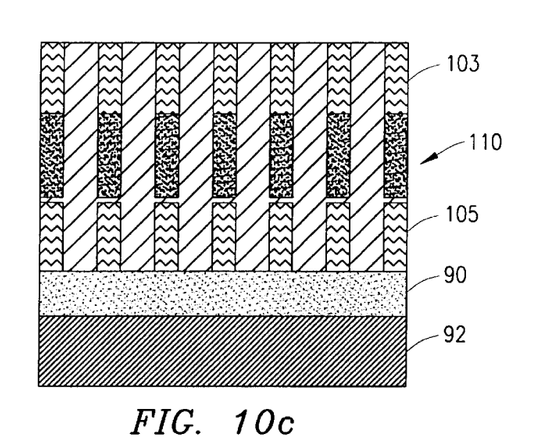
Figure 10D:
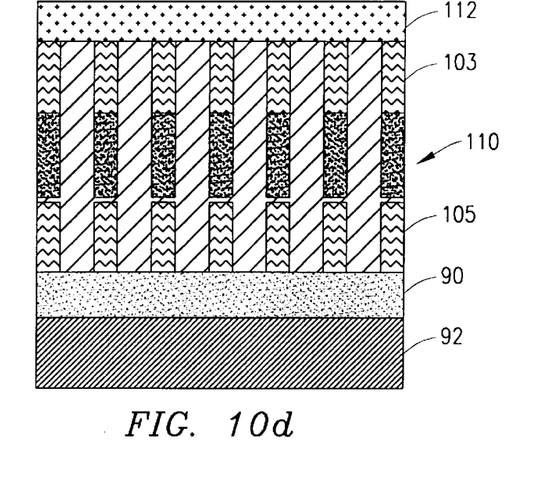
Figure 10E:
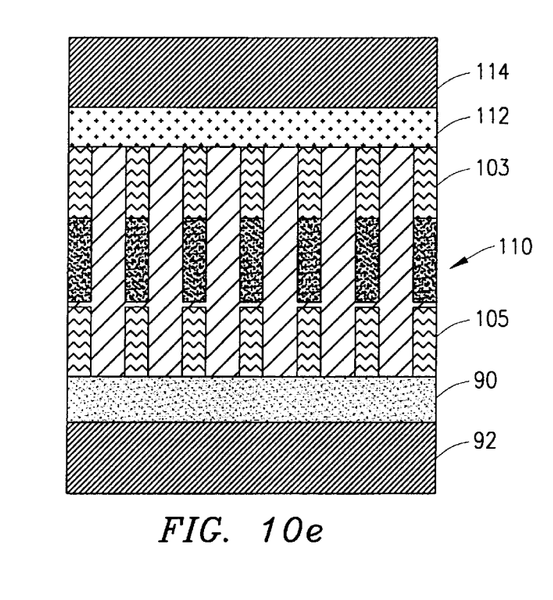
Figure 10F:
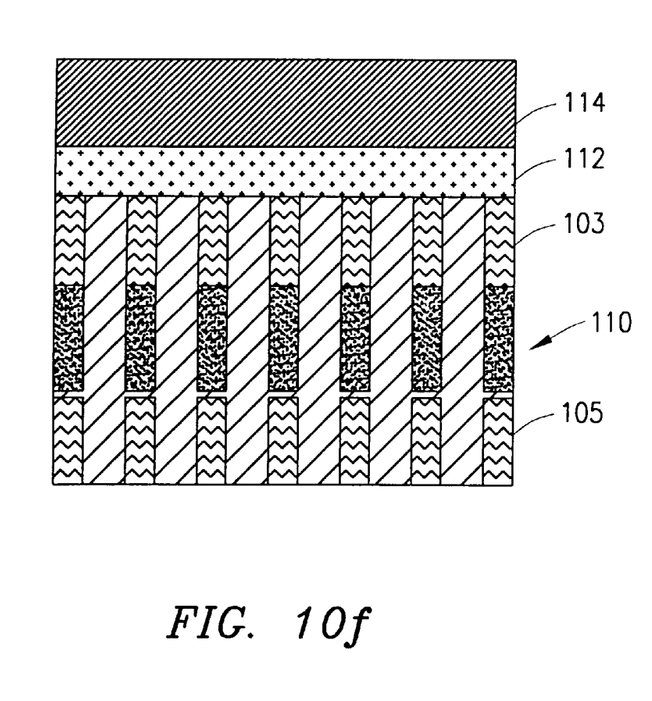
Figure 10G:
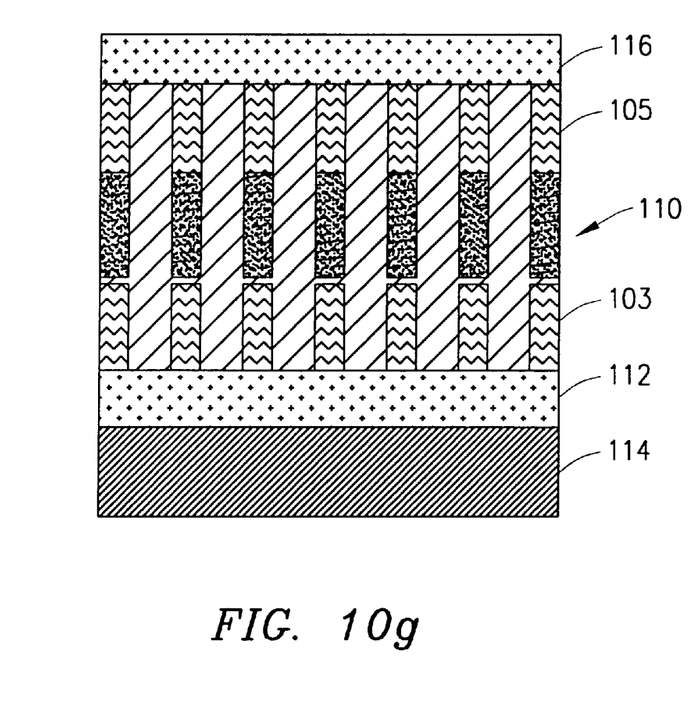

An alternative processing route, is illustrated in FIGS. 10a–10a–10g. In this procedure, after sacrificial layer 90 is deposited on the substrate 92, an Al-containing cladding layer 104 is deposited on the sacrificial layer 90 and core layer 106 is deposited on the cladding layer 104. Thereafter, however, as illustrated in FIG. 10a, an upper Al-containing cladding layer 102 is deposited on top of the core layer 106. Then, the photonic crystal structure is patterned and then etched through both cladding layers as shown at 108 in FIG. 10b. The wet oxidation process causes cladding layers 102 and 104 to become $Al_2O_3$ cladding layers 103 and 105, respectively. Following oxidation, a planarization step is accomplished as described above for the Si process to provide planarized stack layer 110 (FIG. 10c). The remaining processing sequence is nearly identical to that of the Si process except that the sacrificial layer 90 and the substrate 92 are removed and only a metallic cladding layer needs to be applied. Specifically, a metallic stack layer 112 is applied (FIG. 10d), a second substrate 114 is applied (FIG. 10e), the sacrificial layer 90 and the bottom substrate 92 are removed (FIG. 10f), and a second metallic film layer 116 is applied to the planarized stack layer 110 as shown in FIG. 10g (again note that the structure of FIG. 10f is turned over before applying the second metal layer 116 shown in FIG. 10g). The structure shown in FIG. 10g comprises a completed two-dimensional photonic crystal slab apparatus, typically a two-dimensional photonic crystal slab waveguide apparatus, that comprises a photonic crystal slab comprised of the planarized stack layer 110 sandwiched between upper and lower cladding layers with the lower cladding layer being mounted on a substrate 114. The upper cladding layer includes $Al_2O_3$ cladding layer 105 and metallic cladding layer 116, and the lower cladding layer comprises $Al_2O_3$ cladding layer 103 and metallic cladding layer 112

The above-described fabrication procedures can be effectively utilized to fabricate two-dimensional photonic crystal slab apparatus such as those illustrated in FIGS. 1–4. It should be understood, however, that the procedures can also be used to fabricate other two-dimensional photonic crystal slab apparatus, including apparatus in which the cladding layers comprise layers of either metal or a dielectric, or both. In addition, it should be understood that the two-dimensional photonic crystal slab apparatus according to the present invention can also be fabricated by procedures different from those described herein without departing from the scope of the invention.

While what has been described constitutes presently preferred embodiments of the invention, it should be recognized that the invention can be varied in numerous ways without departing therefrom. Accordingly, it should be understood that the invention should be limited only insofar as is required by the scope of the following claims.

What is claimed is:

1. A two-dimensional-photonic crystal slab apparatus, comprising:
    a photonic crystal slab that includes a two-dimensional periodic lattice; and
    upper and lower cladding layers for the photonic crystal slab, the upper and lower cladding layers each including:
    a metallic cladding layer; and
    a dielectric cladding layer between the metallic cladding layer and the photonic crystal slab.

2. The two-dimensional photonic crystal slab apparatus according to claim 1, wherein each dielectric cladding layer comprises an oxide cladding layer.

3. The two-dimensional photonic crystal slab apparatus according to claim 1, wherein said apparatus comprises a two-dimensional photonic crystal slab waveguide apparatus, and wherein the two-dimensional periodic lattice of said photonic crystal slab includes a region of defects therein for defining a waveguide.

4. The two-dimensional photonic crystal slab apparatus according to claim 3, wherein said region of defects is selected from the group consisting of a straight line of defects for defining a straight waveguide and a bent line of defects for defining a bent waveguide.

5. The two-dimensional photonic crystal slab apparatus according to claim 1, wherein said two-dimensional periodic lattice comprises a two-dimensional array of dielectric rods.

6. A method for fabricating a two-dimensional photonic crystal slab apparatus, comprising:
    providing a dielectric slab supported on a first substrate;
    forming a two-dimensional array of dielectric structures in said dielectric slab to form a two-dimensional photonic crystal slab that includes a two-dimensional periodic lattice; and
    forming first and second cladding layers on first and second surfaces of said photonic crystal slab, said first and second cladding layers each including:
    a metallic cladding layer; and a dielectric cladding layer between the metallic cladding layer and the photonic crystal slab.

7. The method according to claim 6, wherein forming a two-dimensional array of dielectric structures in said dielectric slab comprises forming a two-dimensional array of dielectric structures by an etch process.

8. The method according to claim 6, and further comprising planarizing said two-dimensional photonic crystal slab by introducing a planarizing medium between said dielectric structures.

9. The method according to claim 6, wherein forming first and second cladding layers on first and second surfaces of said formed photonic crystal slab includes:

applying said first cladding layer to said first surface of said two-dimensional photonic crystal slab;

mounting a second substrate to said first cladding layer;

removing said first substrate; and applying said second cladding layer to said second surface of said two-dimensional photonic crystal slab.

10. The method according to claim 9, wherein said dielectric slab is mounted to said first substrate by a sacrificial layer, and wherein removing said first substrate comprises removing both said sacrificial layer and said first substrate.

11. The method according to claim 6, wherein forming first and second cladding layers on first and second surfaces of said photonic crystal slab comprises applying first and second dielectric cladding layers of low index material to said photonic crystal slab, and applying first and second metallic cladding layers to said first and second dielectric cladding layers of low index material.

12. The method according to claim 9, wherein said dielectric slab comprises a Si dielectric slab.

13. The method according to claim 6, wherein forming first and second cladding layers on first and second surfaces of said photonic crystal slab includes:

applying a cladding material to first and second surfaces of said dielecric slab; and performing an etch process on said cladding material and on said dielectric slab to provide a two-dimensional photonic crystal slab having first and second dielectric cladding layers on said first and second surfaces thereof.

14. The method according to claim 13, wherein said cladding material comprises an Al-containing cladding material, and wherein said method further includes oxidizing said Al-containing cladding material.

15. The method according to claim 13, wherein said dielectric slab comprises a material selected from the group consisting of InGaAsP and GaAs.

16. A method for fabricating a two-dimensional photonic crystal slab apparatus that includes a photonic crystal slab and first and second cladding layers on first and second surfaces of said photonic crystal slab, each of said first and second cladding layers including a metallic cladding layer and a dielectric cladding layer between the metallic cladding layer and the photonic crystal slab, comprising:

providing a dielectric slab supported on a first substrate;

forming a two-dimensional array of dielectric structures in said dielectric slab by an etch process to form a two-dimensional photonic crystal slab having a two-dimensional periodic lattice;

depositing a first metallic cladding layer of said first cladding layer on a first surface of said two-dimensional array of dielectric structures;

mounting a second substrate to said first metallic cladding layer;

removing said first substrate; and depositing a second metallic cladding layer of said second cladding layer on a second surface of said two-dimensional array of dielectric structures.

17. The method according to claim 16, wherein said method further comprises forming first and second dielectric cladding layers by applying first and second layers of dielectric material on first and second surfaces of said dielectric slab, and forming said first and second dielectric cladding layers and said two-dimensional photonic crystal slab by said etch process.

18. The method according to claim 17, wherein forming said first and second dielectric cladding layers comprises providing first and second layers of an Al-containing cladding material, and wherein said method further includes oxidizing said first and second layers of Al-containing cladding material.

19. The two-dimensional photonic crystal slab apparatus according to claim 1, wherein said photonic crystal slab comprises a material selected from the group consisting of Si, InGaAsP and GaAs.

20. The two-dimensional photonic crystal slab apparatus according to claim 2, wherein each oxide cladding layer comprises a material selected from the group consisting of $Al_2O_3$ and $SiO_2$.

* * * * *